US008823900B2

United States Patent
Kubota

(10) Patent No.: US 8,823,900 B2
(45) Date of Patent: Sep. 2, 2014

(54) ILLUMINATION DEVICE AND ELECTROOPTIC APPARATUS

(75) Inventor: Takehiko Kubota, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 339 days.

(21) Appl. No.: 13/163,187

(22) Filed: Jun. 17, 2011

(65) Prior Publication Data
US 2012/0002131 A1    Jan. 5, 2012

(30) Foreign Application Priority Data
Jun. 30, 2010    (JP) ................................. 2010-148751

(51) Int. Cl.
    *G02F 1/1335*      (2006.01)

(52) U.S. Cl.
    CPC .. *G02F 1/1336* (2013.01); *G02F 2001/133616* (2013.01); *G02F 1/133526* (2013.01)
    USPC ................................ 349/63; 349/57; 362/603

(58) Field of Classification Search
    CPC ............... G02F 1/133526; G02F 2001/133616
    USPC ...................... 349/63, 57; 362/603
    See application file for complete search history.

(56) References Cited

U.S. PATENT DOCUMENTS

| 5,139,340 | A | 8/1992 | Okumura |
| 6,556,260 | B1 * | 4/2003 | Itou et al. ........................ 349/69 |
| 2005/0146897 | A1 * | 7/2005 | Mimura et al. ............... 362/623 |
| 2010/0053501 | A1 * | 3/2010 | Nakayoshi et al. ............. 349/63 |

FOREIGN PATENT DOCUMENTS

| JP | A-3-223715 | 10/1991 |
| JP | A-2000-267097 | 9/2000 |

* cited by examiner

*Primary Examiner* — Jessica M Merlin
(74) *Attorney, Agent, or Firm* — Oliff PLC

(57) ABSTRACT

An illumination device is a device which irradiates light to a reflection-type display panel in which a liquid crystal is sandwiched between a pair of substrates. The illumination device includes a light emitting portion formed such that an organic EL layer is sandwiched between the pair of substrates. A first electrode which is in contact with the organic EL layer includes a metal portion and a transparent portion through which light can transmit. Light does not transmit through the metal portion provided at the viewing side. Further, the illumination device includes a microlens array arranged so as to cover the light emitting portion at the viewing side of the light emitting portion.

13 Claims, 6 Drawing Sheets

FIRST EMBODIMENT (PLAN VIEW)

COMPARATIVE EXAMPLE (PLAN VIEW)

ILLUMINATION DEVICE AND ELECTROOPTIC APPARATUS

BACKGROUND

1. Technical Field

The present invention relates to the technical field of an illumination device which irradiates light to a reflection-type display panel and an electrooptic apparatus.

2. Related Art

As an existing display using a liquid crystal device, a transmission-type liquid crystal device including a back light as a light source has been primarily used. However, power consumption has been needed to be reduced in a liquid crystal device which is mainly used in a mobile electronic apparatus. The transmission-type liquid crystal device requiring a back light has had limitations on the less power consumption. Therefore, a reflection-type liquid crystal device is eagerly being developed.

In the reflection-type liquid crystal device, natural light or the like from outside is used as a light source. Therefore, power consumption can be largely reduced. However, clear display cannot be achieved in a dark place, on the other hand. Therefore, in recent years, a reflection-type liquid crystal device including a front light has been disclosed. JP-A-2000-267097 is an example of related art.

With the reflection-type liquid crystal device including the front light, it is sufficient that the front light is turned ON or OFF depending on brightness of places at which the reflection-type liquid crystal device is used. Therefore, the reduction in power consumption of a mobile electronic apparatus including such reflection-type liquid crystal device can be achieved. Therefore, the mobile electronic apparatus does not consume the battery more than necessary so that the mobile electronic apparatus can be driven for a long time.

However, when the reflection-type liquid crystal device including the front light is used, there arises a problem that display visibility is deteriorated as follows. That is, light incident from a viewing side, or, an observer side, namely, so-called outside light is reflected by a metal portion of an electrode of a light emitting portion, or, light output to the viewing side from the light emitting portion, namely, so-called inside light is reflected by the metal portion. With this, a so-called dot is generated at a position on the light emitting portion arising the problem that display visibility being deteriorated.

SUMMARY

An advantage of some aspects of the invention is to provide an illumination device in which visibility is further improved and an electrooptic apparatus, considering the above problems.

An illumination device according to an aspect of the invention irradiates light to a reflection-type liquid crystal panel in which a liquid crystal is sandwiched between a pair of substrates. The illumination device includes an illumination unit which has a light emitting portion formed such that a light emitting layer is sandwiched between the pair of substrates, and a reduction lens which is arranged so as to cover the light emitting portion at a viewing side of the light emitting portion.

With the illumination device according to the aspect of the invention, the reduction lens is arranged so as to cover the light emitting portion at the viewing side of the light emitting portion. Note that the expression "viewing side" in the aspect of the invention indicates a side of an observer who observes light. With this configuration, the degree that a dot generated at a position on the metal portion of a cathode electrode of the light emitting portion is visually recognized by an observer can be reduced effectively, thereby improving display visibility.

Therefore, need of microfabrication carried out for shape-forming of the light emitting portion such that the dot is not visually recognized by an observer can be effectively reduced. Therefore, improvement in yield when the light emitting portion is manufactured and long life of the light emitting material of the light emitting portion can be realized. In particular, in the case where an organic electro-luminescence (OEL) is used as the light emitting portion in a front light-type liquid crystal device, it is technically difficult to make the light emitting portion smaller with the microfabrication. Therefore, practically, it is significantly advantageous that the dot is made difficult to be observed by an observer by adding a reduction lens.

In the illumination device according to an aspect of the invention, it is preferable that the illumination unit have a plurality of light emitting portions, and a plurality of reduction lenses be arranged so as to cover the plurality of light emitting portions respectively at the viewing side of the plurality of light emitting portions.

According to the aspect of the invention, the degree that a plurality of dots at positions on the metal portions of the cathode electrodes of the plurality of the light emitting portions are visually recognized by an observer can be effectively reduced.

In the illumination device according to another aspect of the invention, it is preferable that the reduction lens be a microlens array.

With the aspect of the invention, the reduction lens can be easily realized.

In the illumination device according to another aspect of the invention, it is preferable that the illumination device further include a light shielding portion which is arranged at the viewing side of the light emitting portion and shields outside light or inside light, and the reduction lens be arranged so as to cover the light shielding portion at the viewing side of the light shielding portion.

According to the aspect of the invention, the light shielding portion is arranged at the viewing side of the light emitting portion and shields outside light or inside light. Note that the expression "shield" in the aspect of the invention indicates that the degree of light transmission is lowered. Further, the expression "outside light" in the aspect of the invention indicates light which is incident on the illumination device from the outside of the illumination device, such as natural light, for example. The expression "inside light" in the aspect of the invention indicates light which is emitted by the light emitting portion, that is, light which is output from the inside of the illumination device. The reduction lens is arranged so as to cover the light shielding portion at the viewing side of the light shielding portion. With this, the degree that a dot generated due to the outside light is visually recognized by an observer can be reduced more effectively.

An electrooptic apparatus according to more another aspect of the invention includes the above illumination device and a reflection-type liquid crystal panel. Further, an electrooptic apparatus according to still another aspect of the invention may include the above illumination device and an electronic paper. As such electrooptic apparatuses, a display, a computer, a mobile phone, and a personal digital assistant are exemplified.

Actions and other advantages of the aspects of the invention will be clear from embodiments for carrying out the aspects of the invention which will be described later.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described with reference to drawings.

First Embodiment

Basic Configuration

Figure 1A:
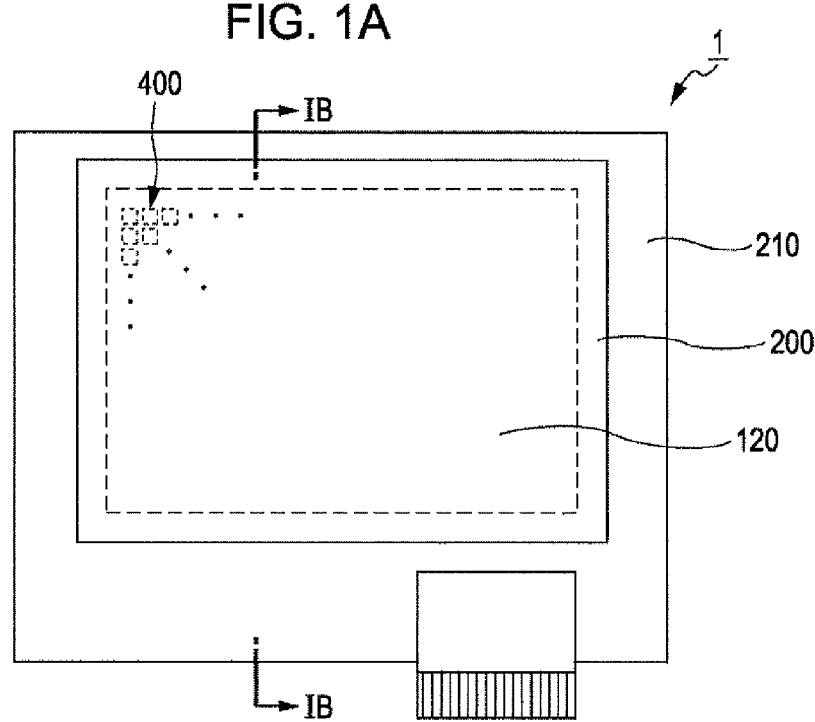
FIG. 1A is a plan view illustrating the configuration of an electrooptic apparatus according to a first embodiment when seen from a viewing side.
Figure 1B:
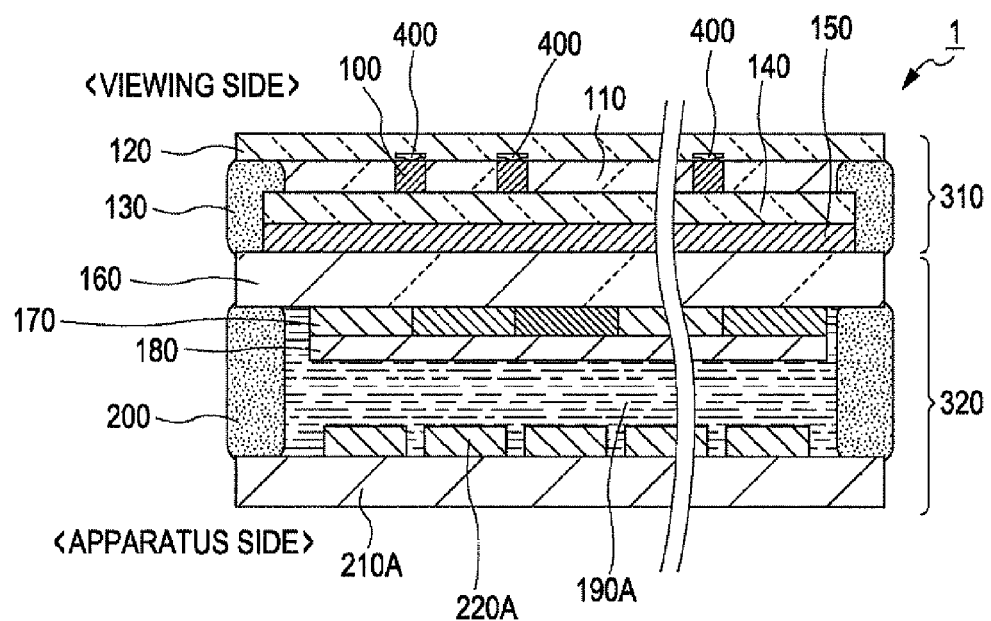
FIG. 1B is a cross-sectional view cut along a line IB-IB of FIG. 1A.

At first, the configuration of an electrooptic apparatus 1 including an illumination device and a reflection-type liquid crystal panel according to the first embodiment is described with reference to FIGS. 1A and 1B. FIG. 1A is a plan view illustrating the configuration of the electrooptic apparatus 1 according to the embodiment when seen from a viewing side, and FIG. 1B is a cross-sectional view cut along a line IB-IB of FIG. 1A. That is, FIG. 1A is a plan view and FIG. 1B is a cross-sectional view cut along the line IB-IB of FIG. 1A. It is to be noted that FIGS. 1A and 1B illustrate a liquid crystal device in which a single polarizing plate-type liquid crystal display system and active matrix driving with a TFT are combined.

Liquid Crystal Panel

As illustrated in FIG. 1B, pixel electrodes 220A each having a substantially square shape are arranged on an upper surface of a lower substrate 210A. The pixel electrodes 220A are arranged vertically and horizontally in a matrix form.

Each pixel electrode 220A is made of Al (aluminum) or the like and serves as a reflection plate. Scanning lines and data lines (not illustrated) are arranged on grid-like portions on which the pixel electrodes 220A are not formed so as to vertically and horizontally intersect with each other. Further, although not illustrated, thin film transistors (hereinafter, referred to as TFTs) are formed near the intersections of the scanning lines and the data lines. Each pixel electrode 220A is connected to a drain electrode of each TFT. Further, the data lines are connected to source electrodes of the TFTs and the scanning lines are connected to gate electrodes of the TFTs. With this, a voltage to be applied to each pixel electrode is controlled by each TFT.

An upper substrate 160 is a transparent glass substrate and a color filter 170 is formed on the surface of the upper substrate 160 at a liquid crystal side. A transparent electrode 180 made of ITO is formed on the color filter 170 over an entire display region.

In this case, the pixel electrodes serve as reflection plates. A metal used for the pixel electrodes is not limited to Al and it is sufficient that the metal having high reflectance, such as nickel (Ni), chromium (Cr) or an alloy thereof is used. Further, reflection plates made of a metal such as Al, Ni, or Cr can be provided on surfaces of the pixel electrodes in addition to the pixel electrodes. Further, one reflection plate can be provided at the back side (lower side in FIG. 1B) of the lower substrate 210A while the pixel electrodes are formed to be transparent electrodes made of ITO or the like and the lower substrate is formed to be a transparent glass substrate. In the case of monochrome display, the color filter 170 is not required to be provided.

After the color filter and electrodes as described above are formed on the substrates, an alignment film using polyimide is formed on each substrate and an alignment processing is performed on the alignment film in a predetermined direction. Thereafter, surfaces of the substrates on which electrodes are formed are opposed to and bonded to each other with a sealing material 200 with a predetermined gap therebetween. Further, a liquid crystal 190A is held so as to be sandwiched between the lower substrate 210A and the upper substrate 160. As a liquid crystal material and an alignment direction thereof, those under a condition that only one polarizing plate is used may be selected as disclosed in JP-A-3-223715.

Further, a phase difference plate 150 and a polarizing plate 140 are formed on the outer surface of the upper substrate 160. It is to be noted that a plurality of phase difference plates 150 may be provided if necessary or a configuration may be that the phase difference plate is not provided. Phase difference plates of which phase differences are different from each other, a phase difference plate for compensating a view angle, and the like can be arranged depending on display characteristics. A reflection-type liquid crystal panel 320 is configured in the above manner.

Illumination Device

Next, an illumination device is described with reference to FIGS. 1A and 1B.

As illustrated in FIG. 1B, in the embodiment, a supporting plate 120 having a thickness of 0.2 mm and made of a glass is arranged on the upper side of the liquid crystal panel. Light emitting portions 100 each of which is formed with an organic EL are formed on the inner surface (lower surface in FIG. 1B) of the supporting plate 120. The light emitting portions 100 are formed on portions between pixels on the liquid crystal panel in a grid form so as to constitute an illumination device 310. Namely, the light emitting portions 100 are formed on the portions in which the data lines and the scanning lines are overlapped when the liquid crystal panel is seen from the above in the case of an active matrix type. Preferably, when the liquid crystal panel is viewed, the light emitting portions are formed so as not to overlap with the pixel electrodes when seen from above. With this configuration, a reflection region can be ensured without making a display region narrower so that a bright reflection-type liquid crystal device can be obtained.

In the illumination device 310 configured as described above, the surface of the supporting plate 120 on which the light emitting portions 100 are formed and the polarizing plate 140 are opposed to and bonded to each other with an adhesive 130. Further, a light transmissive member 110 is formed on a portion sandwiched between the supporting plate 120 and the polarizing plate 140. The light transmissive member 110 is used for the following two effects. One effect thereof is to prevent outside light from being reflected on the surfaces of the supporting plate 120 and the polarizing plate 140. The other effect thereof is to prevent loss of light emission lives of the light emitting portions 100 each of which is formed with an organic EL (which will be described later) due to adsorption of water to the light emitting portions 100 or the like from occurring. Therefore, as a material of the light transmissive member 110, a material which has a refractive index of approximately 1.5, which is the same as that of the glass substrate forming the supporting plate, and through which water does not transmit is desirably used. For example, an epoxy-based resin or the like can be used for the light transmissive member 110.

In the following description, a direction of the liquid crystal panel 320 when seen from the illumination device 310 is referred to as "apparatus side" and a direction opposite to the above direction, that is, the side at which a user views the electrooptic apparatus 1 is referred to as "viewing side".

An electrooptic apparatus according to the embodiment is configured to include microlens arrays 400. The microlens arrays 400 are arranged at the viewing side of the light emitting portions 100 so as to cover the light emitting portions 100. The microlens arrays 400 function as so-called reduction lenses. Each microlens array 400 may be formed with a plastic material having a concavo-convex shape. As illustrated in FIG. 1A, a plurality of microlens arrays 400 are arranged at the inner side of the supporting plate 120 in a matrix form so as to correspond to the plurality of light emitting portions 100, respectively. It is to be noted that a detailed configuration of the light emitting portions 100 will be described later.

When a liquid crystal panel is a small-sized panel having a diagonal dimension of approximately equal to or smaller than 2 inches, or when strong adhesive strength between the illumination device 310 and the liquid crystal panel 320 is not required, the illumination device 310 can be fixed to the liquid crystal panel 320 with the light transmissive member 110 without using the adhesive 130.

Detailed Configuration of Light Emitting Portion

Figure 2:
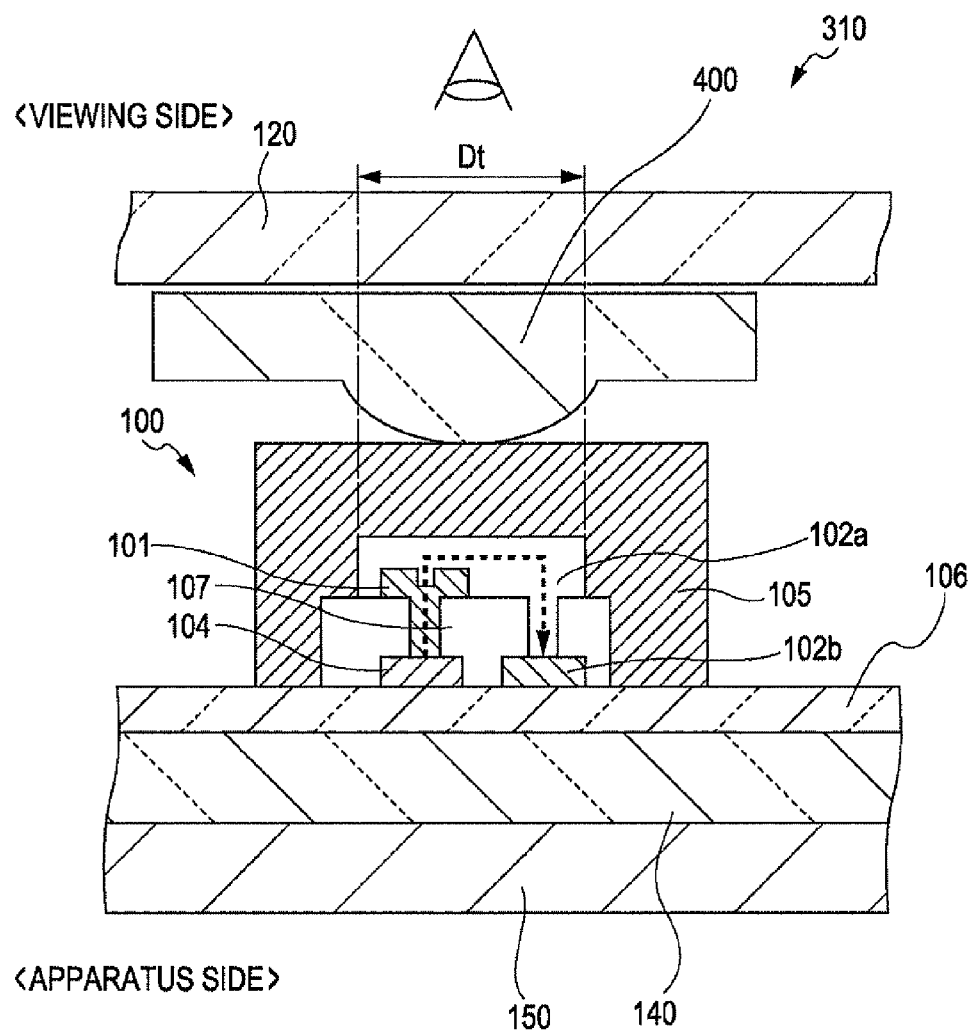
FIG. 2 is a cross-sectional view illustrating the configuration of a light emitting portion according to the first embodiment.

Next, a detailed configuration of each light emitting portion 100 is described with reference to FIG. 2. FIG. 2 is a cross-sectional view illustrating the configuration of the light emitting portion 100 according to the embodiment. It is to be noted that, in FIG. 2, a specific configuration example of the light emitting portion 100 is illustrated. A dotted line arrow in FIG. 2 indicates an electric flow.

As illustrated in FIG. 2, in the illumination device 310 according to the embodiment, each microlens array 400 is arranged on the lower side (that is, apparatus side) of the supporting plate 120 and each light emitting portion 100 is arranged between each microlens array 400 and the polarizing plate 140.

The light emitting portion 100 is configured to include an organic EL layer 101 as a light emitting material, a first electrode 102 as a cathode-side electrode, a second electrode 104 as an anode-side electrode, a sealing portion 105, a glass 106, and a partition wall 107. The sealing portion 105 seals up the organic EL layer 101, the first electrode 102, and the second electrode 104. The partition wall 107 is formed with an insulating transparent material for partitioning the first electrode 102 and the second electrode 104. The first electrode 102 includes a metal portion 102a and a transparent portion 102b.

As the organic EL layer 101 as a light emitting material, an organic light-emitting diode (OLED) can be employed.

The transparent portion 102b of the first electrode and the second electrode 104 are formed on the surface of the glass 106 at the viewing side and are made of a transparent electrokinetic material such as ITO (Indium Tin Oxide).

Figure 3:
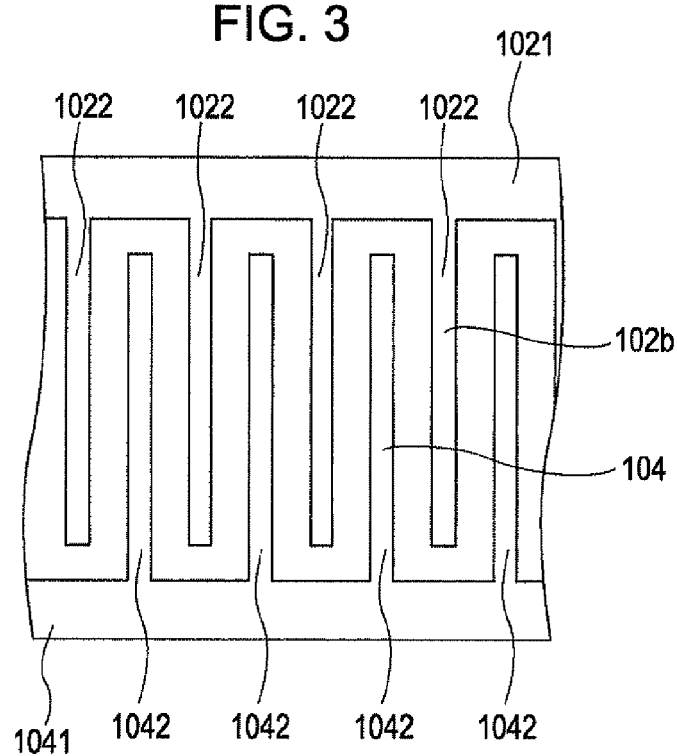
FIG. 3 is a plan view illustrating an arrangement of electrodes of the light emitting portion according to the first embodiment.

In FIG. 3, an arrangement of the second electrode 104 and the transparent portion 102b of the first electrode on the surface of the glass 106 at the viewing side is illustrated. As illustrated in FIG. 3, the second electrode 104 and the transparent portion 102b have a comb-tooth shape and are arranged at the positions opposed to each other. The second electrode 104 is constituted by a main electrode 1041 and a plurality of linear discrete electrodes 1042 which are arranged in parallel with each other. One end of each discrete electrode 1042 is connected to the main electrode 1041. In the same manner, the transparent portion 102b is constituted by a main electrode 1021 and a plurality of discrete electrodes 1022 which are arranged in parallel with each other. One end of each discrete electrode 1022 is connected to the main electrode 1021.

The discrete electrodes 1042 of the second electrode and the discrete electrodes 1022 of the transparent portion are alternately arranged. The main electrode 1041 of the second electrode and the main electrode 1021 of the transparent portion are arranged at opposite sides to each other through the discrete electrodes 1042, 1022.

The organic EL layer 101 has a thickness of 1,500 Å (angstrom) to 10,000 Å and is formed on the second electrode 104. The metal portion 102a of the first electrode, which is made of Al—Li alloy, has a thickness of 300 Å to 2,000 Å and is arranged so as to sandwich the organic EL layer 101. Further, the metal portion 102a is electrically connected to the transparent portion 102b of the first electrode. The metal portion 102a of the first electrode, which is made of Al—Li alloy, also functions as a reflection plate for directing all the light isotropically emitted from the organic EL layer 101 to the direction of the liquid crystal panel 320. If the metal portion 102a has a light shielding function as described above, light emitted from the organic EL layer 101 can be prevented from directly irradiating to the viewing side.

The metal portion 102a of the first electrode is formed by forming a film of oxidized Cr or Al—Li alloy with a mask evaporation method or the like and patterning the obtained film with a photolithography process. Further, the organic EL layer 101, which actually contributes to light emission, is formed on the second electrode with the mask evaporation method, or an ink jet method in which liquefied organic EL material is injected through a minute nozzle to form a pattern.

The second electrode 104 made of ITO and the transparent portion 102b of the first electrode can be formed by patterning with the mask evaporation method or with the photolithography process. A voltage is applied to between the first electrode 102 and the second electrode 104 so that the organic EL layer 101 formed therebetween emits light. In the case of the organic EL, the voltage required for obtaining desired luminance is a direct current voltage of approximately 2 to 10 V.

When an organic material which can be liquefied, such as a polymer material, is used as the organic EL layer, the organic EL layer can be formed with an ink jet method. With this, even when the light emitting portions which are formed in a grid-like pattern or output lights having a plurality of different emitted light colors are formed, the light emitting portions 100 can be formed relatively easily. For example, when the light emitting portions are formed into the grid-like pattern, the pattern cannot be formed with one evaporation processing if the mask evaporation method is used. However, a complicated pattern can be formed easily by direct pattern-writing of the organic EL material with the ink jet method. Further, even when light emitting portions which emit red, green, and blue are selectively formed, the light emitting portions of which emitted light colors are different at different positions can be formed easily by ink jet coating. In this case, for example, cyano-polyphenylene vinylene is used for a red light emitting material, polyphenylene vinylene is used for a green light emitting material, and polyphenylene vinylene with alkyl phenylene is used for a blue light emitting material, thereby forming each organic EL layer 101.

Even when the plurality of light emitting materials are used, the first electrode and the second electrode can be commonly used. Therefore, formation processes other than that of the organic EL layer are the same as those in the case of monochrome.

Hereinbefore, the configuration of the liquid crystal device according to the embodiment has been described. Hereinafter, a method of using the illumination device in the liquid crystal device according to the embodiment is described.

Method Of Using Illumination Device

In the liquid crystal device according to the embodiment, display is made to be visually recognized by using the outside light such as natural light while only the liquid crystal panel is driven without using the illumination device in a normal state. Further, in the liquid crystal device according to the embodiment, the illumination device is turned ON to be used when sufficiently bright display is not obtained when surroundings become dark.

In FIG. 2 as illustrated above, if a switch of the illumination device is turned ON, a voltage is applied to between the first electrode 102 and the second electrode 104 constituting the light emitting portion 100 and colored light is output from the organic EL layer 101 as the light emitting material. At this time, although light is isotropically emitted from the organic EL layer 101, since the metal portion 102a of the first electrode formed at the observer side functions as a reflection plate, light output to the side of the first electrode (that is, viewing side) is reflected by the metal portion 102a of the first electrode. As a result, almost all the light is output to substantially lower side (that is, apparatus side).

As illustrated in FIG. 1B, when the illumination device 310 is attached to the reflection-type liquid crystal panel 320, if the liquid crystal is in a state where light passes through the liquid crystal (that is, white display), output light is incident on the liquid crystal panel, and is reflected by the pixel electrodes 220A which also serve as the reflection plates. Then, the reflected light passes through the liquid crystal panel and the transparent supporting plate 120 forming the illumination device 310 and reaches to an observer. On the other hand, if the liquid crystal is in the light shielding state (black display), light output from the illumination device 310 is shielded by the liquid crystal panel and does not reach to the observer.

Study Of Actions And Effects According To Embodiment

Figure 4:
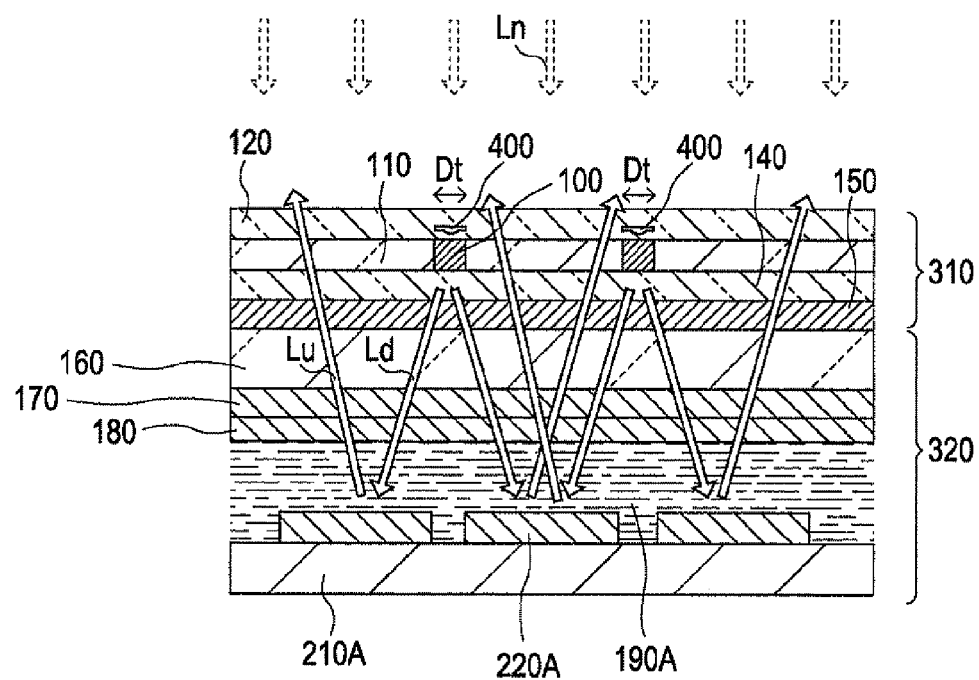
FIG. 4 is a cross-sectional view illustrating the electrooptic apparatus focusing on light directions according to the first embodiment.
Figure 5A:
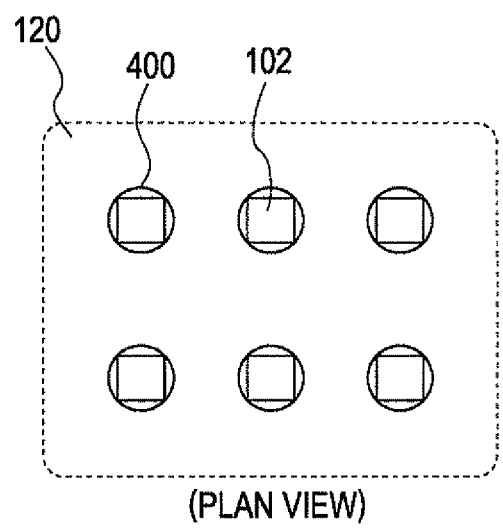
FIG. 5A is a plan view illustrating the electrooptic apparatus according to the first embodiment when seen from the viewing side.
Figure 5B:
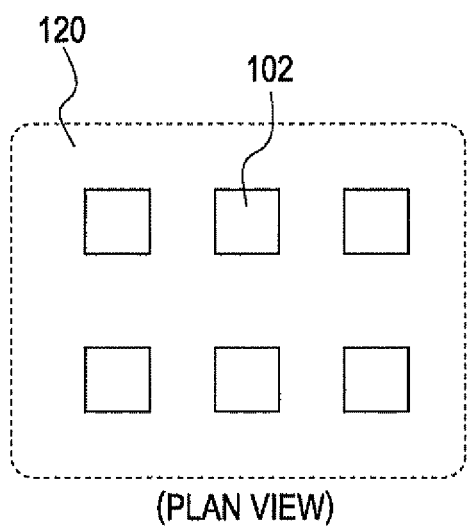
FIG. 5B is a plan view illustrating an electrooptic apparatus according to a comparative example when seen from the viewing side.

Next, actions and effects according to the embodiment are studied with reference to FIG. 4 and FIGS. 5A and 5B. FIG. 4 is a cross-sectional view illustrating the electrooptic apparatus focusing on directions of light according to the embodiment. FIG. 5A is a plan view illustrating the electrooptic apparatus according to the embodiment when seen from the viewing side. FIG. 5B is a plan view illustrating an electrooptic apparatus according to a comparative example when seen from the viewing side.

As illustrated in FIG. 2B, in addition to FIG. 4, if the switch of the illumination device 310 is turned ON, a voltage is applied to between each first electrode 102 and each second electrode 104 constituting each light emitting portion 100 and light Ld is output from each organic EL layer 101 as the light emitting material. At this time, although light is isotropically output from each organic EL layer 101, since each metal portion 102a of each first electrode formed at the observer side functions as a reflection plate, the light Ld output to the side of each first electrode (that is, viewing side) is reflected by the first electrode. As a result, almost all the light Ld is output to the substantially lower side (that is, apparatus side).

In the case where the illumination device 310 is attached onto the reflection-type liquid crystal panel 320 (hereinafter, appropriately referred to as "case of front light-type liquid crystal device"), if the liquid crystal is in a state where light passes through the liquid crystal (that is, white display), the output light Ld is incident on the liquid crystal panel, and is reflected by each pixel electrode 220A which also serves as a reflection plate. Then, the reflected light passes through the transparent supporting plate. 120 and reaches to an observer as light Lu. On the other hand, if the liquid crystal is in the light shielding state (black display), the light Ld output from the illumination device 310 is shielded by the liquid crystal panel 320 and does not reach to the observer.

On the other hand, light Ln which is incident from the side of the supporting plate 120 is reflected by each metal portion 102a of each first electrode. With this, there arise problems that contrast is lowered, visibility is deteriorated, and so on.

In the case of the reflection-type liquid crystal device including a common front light, light which is incident from the viewing side, that is, observer side, namely, so-called outside light is reflected by each metal portion 102a of each first electrode of each light emitting portion 100. Therefore, so-called dot portions (see, Dt in FIG. 4) are visually recognized by an observer.

For example, as illustrated in the comparative example in FIG. 5B, if the microlens arrays 400 functioning as the reduction lenses are not arranged so as to cover the dot portions Dt, the metal portions 102a of the first electrodes which the light emitting portions of the front light-type liquid crystal device have are visually recognized as the dot portions Dt by an observer.

On the contrary, according to the embodiment, as illustrated in FIG. 4, the microlens arrays 400 functioning as the reduction lenses are arranged so as to cover the metal portions 102a of the first electrodes which the light emitting portions 100 of the front light-type liquid crystal device have. With the microlens arrays 400, as illustrated in FIG. 5A, areas of the dot portions Dt can be seen to be smaller when viewed from the observer.

In order to reduce the areas of the dot portions Dt without using the microlens arrays 400, microfabrication is needed for forming the shapes of the light emitting portions 100. However, in the embodiment, the areas of the dot portions Dt can be seen to be smaller by the microlens arrays 400. Therefore, improvement in yield when the light emitting portions are manufactured and long life of the organic EL layers 101 as the light emitting materials can be realized. In particular, when an organic electro-luminescence (OEL) is used in the front light-type liquid crystal device as a light source of each light emitting portion, it is difficult to make each light emitting portion smaller in size with the microfabrication. Therefore, practically, it is significantly advantageous that the dot portions Dt are made difficult to be observed by an observer by adding the microlens arrays 400.

Second Embodiment

Detailed Configuration

Figure 6:
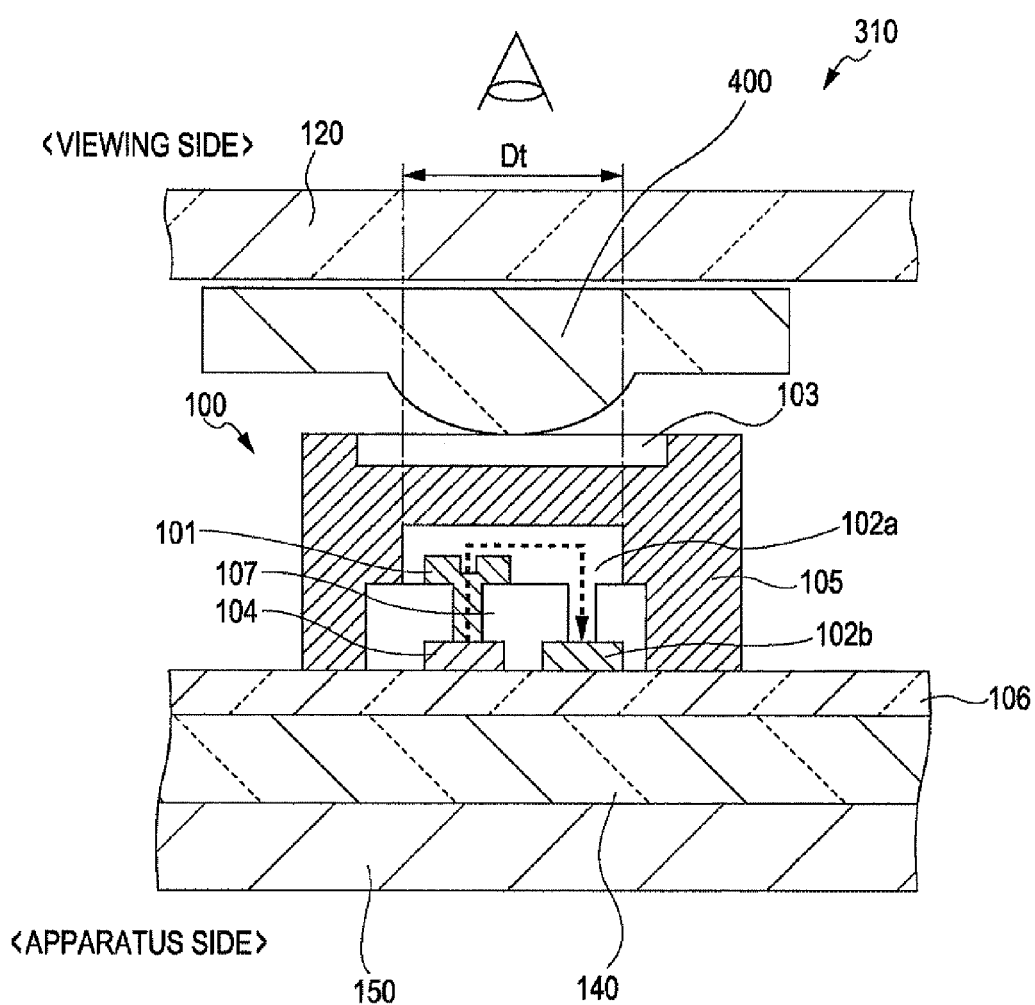
FIG. 6 is a cross-sectional view illustrating the configuration of a light emitting portion according to a second embodiment.

Next, a detailed configuration of an illumination device according to a second embodiment is described with reference to FIG. 6. FIG. 6 is a cross-sectional view illustrating a detailed configuration of the illumination device according to the second embodiment. A dotted line arrow in FIG. 6 indicates an electric flow. Note that the same reference numerals denote components in the second embodiment which are substantially the same as those in the above-described first embodiment and detailed description thereof is not repeated.

As illustrated in FIG. 6, an illumination device 310 according to the second embodiment is configured to include the microlens arrays 400 at the lower side (that is, apparatus side) of the supporting plate 120. Further, the illumination device 310 is configured to include a low reflection layer 103 as a light shielding material which shields light at the lower side (that is, apparatus side) of each microlens array 400. It is to be noted that a specific example of "light shielding portion" according to the invention is constituted by the low reflection layer 103. Each light emitting portion 100 is provided between each low reflection layer 103 and the polarizing plate 140. The low reflection layer 103 is formed for preventing a problem that contrast is lowered from occurring. To be more specific, the problem that contrast is lowered due to reflection of light which is incident from the side of the supporting plate 120 by each first electrode 102 can be prevented from occurring with the low reflection layer 103.

In particular, each microlens array 400 is arranged at the viewing side of each low reflection layer 103 so as to cover the low reflection layer 103. This makes it possible to reduce the degree more effectively that the dot portion Dt generated due to the outside light is visually recognized by an observer.

Hereinbefore, the invention has been described in detail based on the embodiments. However, the invention is not limited to the first and second embodiments. For example, in the embodiments, the liquid crystal device in which only one polarizing plate is arranged has been described. However, a liquid crystal device in which two polarizing plates are arranged so as to sandwich the liquid crystal panel and a reflection plate is provided at the outer side of the polarizing plate at the back surface side can be employed. Further, a liquid crystal panel having a configuration in which the polarizing plate is not used can be employed. That is to say, in the liquid crystal panel in which a composite layer formed with liquid crystal and polymer is sandwiched between a pair of substrates, the polarizing plate is not required to be provided and display can be realized by a light transmission state and a light scattering state. Further, the invention can be applied to a reflection-type liquid crystal display device of a guest host (GH) system using a dichroic dye.

Further, in the above embodiments, the reflection-type liquid crystal panel has been described as an example of a display panel. However, the invention is not limited thereto and an electronic paper may be used instead of the liquid crystal panel. The electronic paper is constituted by dispersing charged particles in a dispersion medium between electrodes. The charged particles may be a two-particle system in which black particles charge positively and white particles charge negatively, and vise versa. Alternatively, the charged particles may be a single-particle system. It is sufficient that the single-particle system disperse charged particles for bright display (for example, white) in a dispersion medium for dark display (for example, black) or disperse charged particles for dark display (for example, black) in a dispersion medium for bright display (for example, white). Further, the charged particles may be a three-particle system containing uncharged particles in addition to two types of charged particles. In addition, the charged particles may be a micro capsule type or a partition wall type.

Electronic Apparatuses

Figure 7:
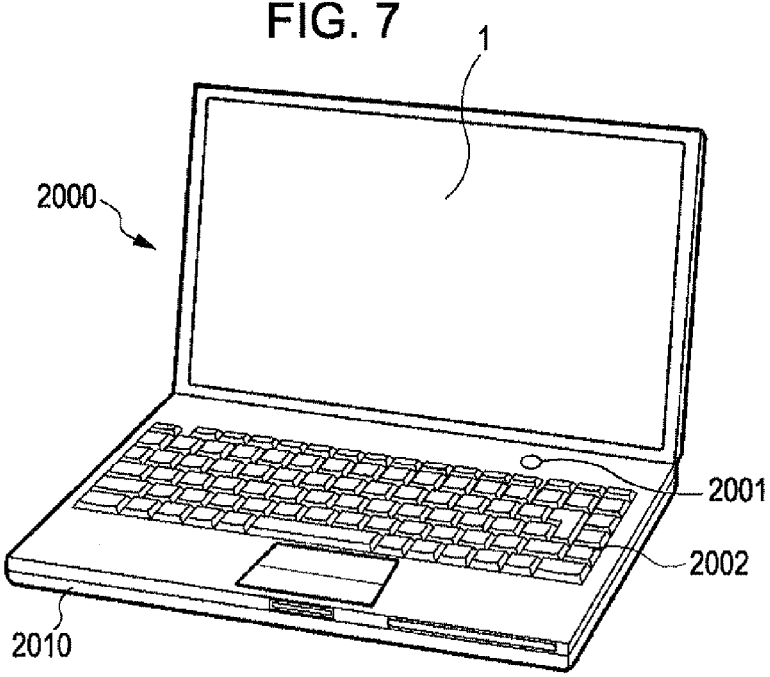
FIG. 7 is a perspective view illustrating the configuration of a personal computer as an example of an electronic apparatus to which the electrooptic apparatus according to the embodiment is applied.

Next, electronic apparatuses to which electrooptic apparatuses 1 according to the above embodiments and variations are applied are described. FIG. 7 illustrates the configuration of a mobile personal computer to which the electrooptic apparatus 1 is applied. A personal computer 2000 includes the electrooptic apparatus 1 serving as a display unit and a main body 2010. A power switch 2001 and a keyboard 2002 are provided on the main body 2010.

Figure 8:
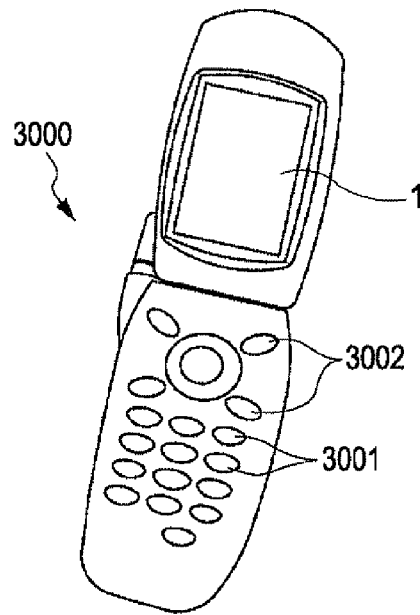
FIG. 8 is a perspective view illustrating the configuration of a mobile phone as an example of an electronic apparatus to which the electrooptic apparatus according to the embodiment is applied.

FIG. 8 illustrates the configuration of a mobile phone to which the electrooptic apparatus 1 is applied. A mobile phone 3000 includes a plurality of operation buttons 3001, scroll buttons 3002, and the electrooptic apparatus 1 serving as a display unit. When the scroll buttons 3002 are operated, a screen displayed on the electrooptic apparatus 1 is scrolled.

Figure 9:
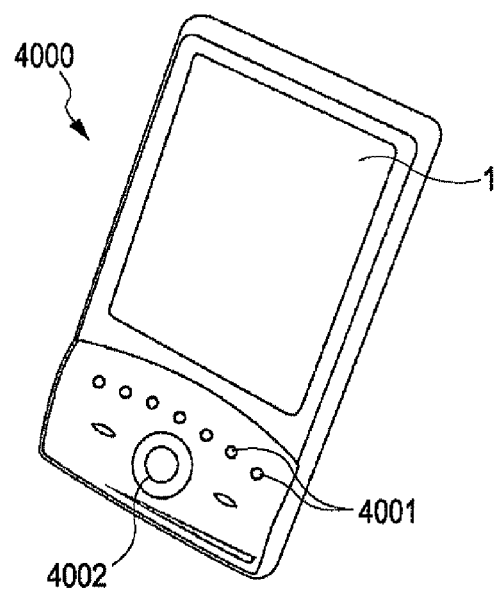
FIG. 9 is a perspective view illustrating the configuration of a personal digital assistant as an example of an electronic apparatus to which the electrooptic apparatus according to the embodiment is applied.

FIG. 9 illustrates the configuration of a Personal Digital Assistant (PDA) to which the electrooptic apparatus 1 is applied. A personal digital assistant 4000 includes a plurality of operation buttons 4001, a power switch 4002, and the electrooptic apparatus 1 serving as a display unit. When the power switch 4002 is operated, various pieces of information such as an address book and a schedule book are displayed on the electrooptic apparatus 1.

As electronic apparatuses to which the electrooptic apparatus 1 is applied, an electronic paper, a digital still camera, a liquid crystal television, a view finder-type and a direct monitoring-type video tape recorder, a car navigation system, a pager, an electronic organizer, a calculator, a word processor, a workstation, a videophone, a POS terminal, a device including a touch panel, and the like are exemplified in addition to the electronic apparatuses as illustrated in FIG. 7 through FIG. 9. Further, the above electrooptic apparatus 1 can be applied as a display unit of these various electronic apparatuses.

The invention is not limited to the above embodiments and can be appropriately changed in a range without departing from the scope or the spirit of the invention read from the aspects of the invention and the entire specification. Further, an illumination device and an electrooptic apparatus including such change are also encompassed within the technical range of the invention.

This application claims priority from Japanese Patent Application No. 2010-148751 filed in the Japanese Patent Office on Jun. 30, 2010, the entire disclosure of which is hereby incorporated by reference in its entirely.

What is claimed is:

1. An illumination device which irradiates light to a liquid crystal sandwiched between a first substrate and a second substrate, the illumination device comprising:
   an illumination unit provided above the first substrate and above the second substrate at a viewing side of the illumination device, the illumination unit including:

a polarizing plate;

a light emitting portion including a light emitting layer, the light emitting portion formed directly above the polarizing plate; and a reduction lens arranged so as to cover the light emitting portion at the viewing side of the light emitting portion, such that the light emitting portion is between the polarizing plate and the reduction lens.

2. The illumination device according to claim 1, wherein the illumination unit has a plurality of light emitting portions, and a plurality of reduction lenses are arranged so as to cover the plurality of light emitting portions at the viewing side of the plurality of light emitting portions.

3. The illumination device according to claim 1, wherein the reduction lens is a microlens array.

4. The illumination device according to claim 1, further including a light shielding portion which is arranged at the viewing side of the light emitting portion and shields outside light or inside light, wherein the reduction lens is arranged so as to cover the light shielding portion at the viewing side of the light shielding portion.

5. An electrooptic apparatus comprising:
the illumination device according to claim 1; and
a reflection-type liquid crystal panel.

6. An electrooptic apparatus comprising:
the illumination device according to claim 2; and
a reflection-type liquid crystal panel.

7. An electrooptic apparatus comprising:
the illumination device according to claim 3; and
a reflection-type liquid crystal panel.

8. An electrooptic apparatus comprising:
the illumination device according to claim 4; and
a reflection-type liquid crystal panel.

9. An electrooptic apparatus comprising:
the illumination device according to claim 1; and
an electronic paper.

10. An electrooptic apparatus comprising:
the illumination device according to claim 2; and
an electronic paper.

11. An electrooptic apparatus comprising:
the illumination device according to claim 3; and
an electronic paper.

12. An electrooptic apparatus comprising:
the illumination device according to claim 4; and
an electronic paper.

13. The illumination device according to claim 1, wherein the reduction lens reduces a dot size perceived by an observer, the dot size generated due to outside light entering the illumination device from the viewing side.

* * * * *